B. M. KENT.
RIM.
APPLICATION FILED JULY 21, 1919.
1,408,950.
Patented Mar. 7, 1922.
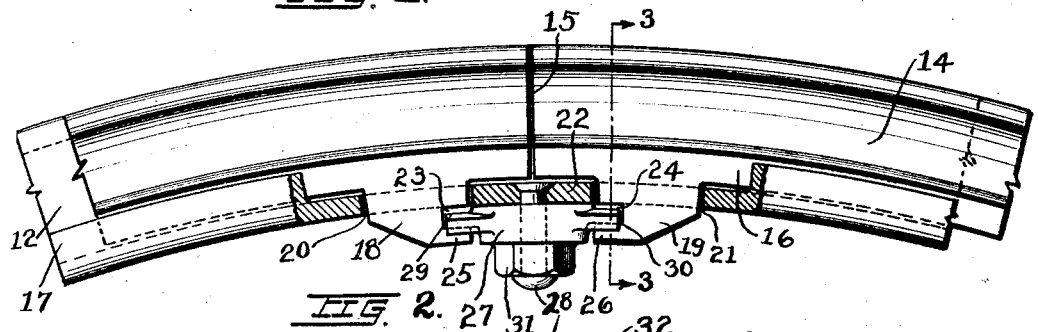
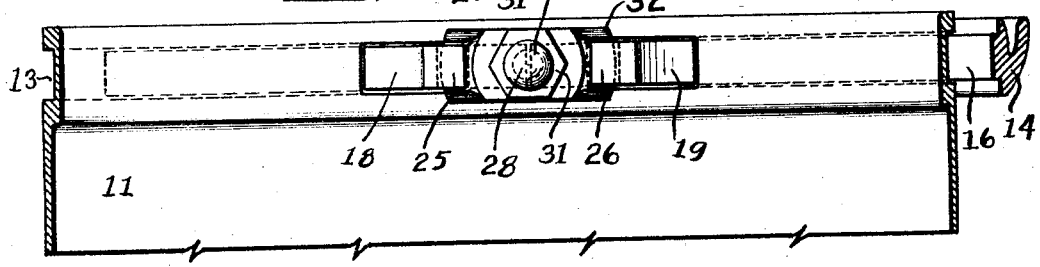
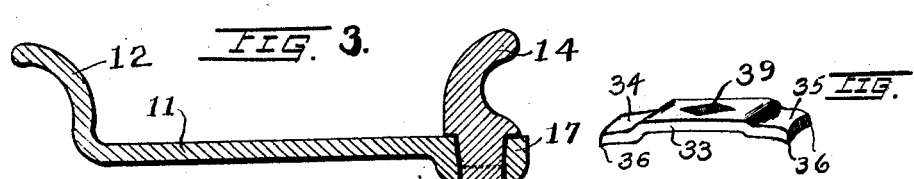
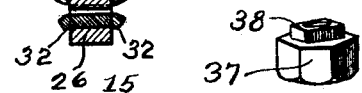
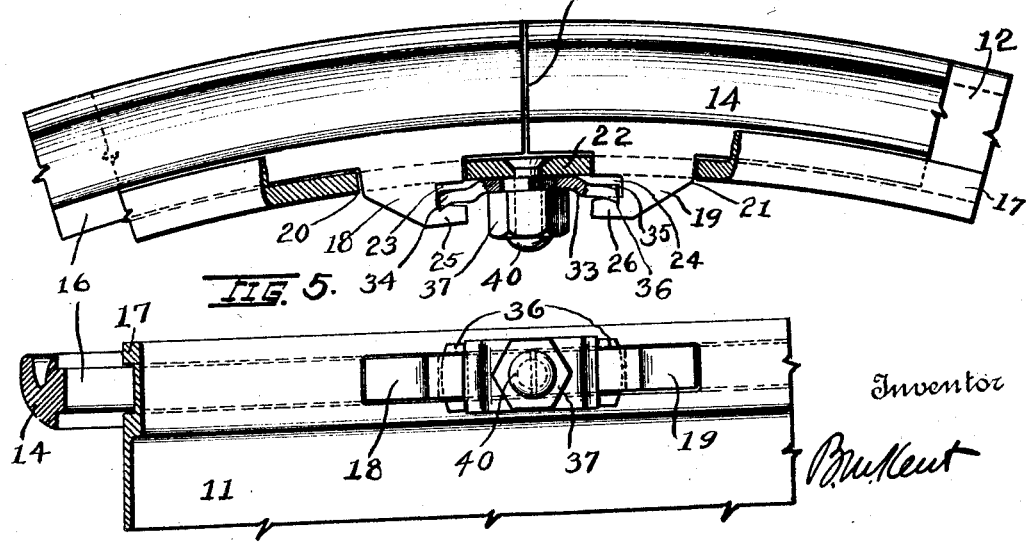
Inventor
B. M. Kent

UNITED STATES PATENT OFFICE.

BERT M. KENT, OF CLEVELAND, OHIO, ASSIGNOR TO THE STANDARD PARTS COMPANY, OF CLEVELAND, OHIO, A CORPORATION OF OHIO.

RIM.

1,408,950.  Specification of Letters Patent.  Patented Mar. 7, 1922.

Application filed July 21, 1919. Serial No. 312,286.

*To all whom it may concern:*

Be it known that I, BERT M. KENT, a citizen of the United States, and a resident of Cleveland, county of Cuyahoga, State of Ohio, have invented certain new and useful Improvements in Rims, of which the following is a specification.

This invention relates to vehicle wheel rims and more particularly to tire-supporting rims of the so-called quick-detachable type, which have a side ring detachably mounted at one edge thereof to facilitate the removal or replacing of a tire.

One of the objects of the invention is the provision of simple and effective means for holding the detachable side ring in position upon the rim, the movable parts of which will be effectively held in locking position but may be readily moved to or from locking position.

Other objects of the invention and the features of novelty will be apparent from the following description, taken in connection with the accompanying drawings, in which:—

Figure 1 is a fragmentary side elevation of a wheel rim embodying my invention, a part of the rim being broken away at one point to more clearly disclose the structure;

Fig. 2 is a fragmentary bottom plan view of the structure shown in Fig. 1;

Fig. 3 is a transverse section on the line 3—3 of Fig. 1;

Fig. 4 is a fragmentary side elevation similar to Fig. 1, but showing a modified structure embodying my invention;

Fig. 5 is a fragmentary bottom plan view of the structure shown in Fig. 4; and

Figs. 6 and 7 are views in perspective of certain of the parts shown in Figs. 4 and 5.

In the drawings, 11 indicates a vehicle wheel rim having a tire-retaining flange 12 at one edge thereof, and provided adjacent its other edge with a circumferential channel or groove 13 to receive a side ring 14 which is transversely split, as shown at 15, and is sufficiently resilient to permit it to be sprung into position upon the rim. The side ring 14 is formed with a base or web 16 thereon, which engages in the channel 13 when the side ring is in seated position, to interlock with the outer side wall 17 of the channel 13 and be held thereby in position laterally on the rim. The side ring 14 is provided, adjacent its ends, with lugs 18 and 19 which extend inwardly from the web 16 through apertures 20 and 21, which are formed in the rim at the bottom of the channel 13 so as to leave a web portion 22 therebetween. The lugs 18 and 19 are formed with transversely extending slots 23 and 24, respectively, so as to form forwardly projecting toes 25 and 26, and a locking member is pivotally mounted on the rim in such a manner that, in one position thereof, its ends will engage in the slots 23 and 24 to hold the ends of the ring from moving radially outwardly and, thereby, hold the ring in seated position.

It is desirable, in rims of this type, to provide means which will normally hold the locking member in its locking position, so that it will not become loosened under the strains and jars incident to travel, but which can be readily moved to or from locking position by the use of the tools usually at hand. To this end, I have provided a locking member which has those portions thereof which engage in the slots in the lugs 18 and 19 adapted to resiliently interlock with the lugs. In the preferred embodiments of my invention illustrated and described herein, slight projections are formed on the ends of the locking member at each edge thereof so that the engagement of such projections with the sides of the lugs will resiliently oppose the rotation of the locking member from its locking position, but it will be evident that many ways of effecting such interlocking engagement may be devised.

In the structure illustrated in Figs. 1 to 3, I have shown a locking member 27 which is pivotally mounted on the rim, as by means of a rivet 28 which extends through the web portion 22, or in any other suitable manner, the oppositely extending ends 29 and 30 of the locking member being adapted to enter the transverse slots 23 and 24 in the lugs to lock the side ring in position. An operating head 31 of non-circular outline, is formed on the locking member 27, such head being preferably hexagonal, as shown, and extending radially inwardly below the lugs 18 and 19, to facilitate the application of a wrench thereto for moving it to and from locking position. In order to hold the locking member 27 in its locking position, each of the ends 29 and 30 thereof is formed with projections 32 at the edges thereof, which are adapted to engage on opposite sides of the lugs, when the member is in locking position, such projections being conveniently formed by bending over the ends of the member 27 at each edge, as best shown in Fig. 3. The slots 23 and 24 are sufficiently wide to permit the ends 29 and 30 to enter therein, and the walls of the channel 13 and the inner surfaces of the side ring 14, adjacent the web portion 22, are so shaped as to normally leave a slight space therebetween, so that the ends of the ring can be sprung inwardly sufficiently to permit the projections 32 to pass over the toes 25 and 26. When the member 27 is in locking position, the ends of the ring will resume their natural formation, so as to hold the toes 25 and 26 engaged against the bottom surface of the ends 29 and 30 of the locking member between the projections 32 thereon, to resiliently hold it in position. It will be understood that, if desired, only one end of the member 27 need be provided with the projections, 32, and the same effect obtained.

In the modified structure shown in Figs. 4 to 7, I have provided a locking member 33 having ends 34 and 35 thereon, which are similar to the ends 29 and 30 of the locking member 27, and are provided with projections 36, which are somewhat similar to the projections 32 of said member. The locking member 33 is preferably formed of spring metal and the ends thereof deflected slightly away from the rim 11, the projections 36 being formed on such deflected ends by bending over the corners thereof, and it is preferable that such bent-over portions should not extend along the edge of the member 33 beyond the ends of the toes 25 and 26 of the lugs, so that the engagement of the bent edge of the member will facilitate its entry into the slots 23 and 24. When the member is turned to locking position, the deflected ends of the member will be bent upwardly toward the rim and will spring back to normal position when the member is in locking position. A non-circular operating head 37, which is adapted to be engaged by a wrench or other operating tool, and preferably hexagonal, as shown, is provided to rotate the member 33 to and from locking position, the head 37 being formed with a squared portion 38 thereon which fits into a similarly shaped opening 39 in the locking member 33, both the locking head 37 and the member 33 being pivotally mounted on the rim 11 by a rivet 40, which extends through the members and holds them in assembled relation.

It will be understood that in either of the structures described, the side ring 14 may be seated on the rim in the usual manner, by first seating one of the lugs, 18 or 19, in its aperture and then progressively seating the ring around the circumference of the rim. The rear edges of the lugs 18 and 19 are preferably beveled, so that if the lug last seated in its aperture does not register accurately therewith, its entry into its aperture will be facilitated by the engagement of such beveled edge with the rim at the rear end of the aperture, and when both of the lugs are seated in their apertures, the locking member may be rotated to engage therewith, the resilience of the parts being sufficient to hold the locking member in its locking position under all normal conditions of use.

Having thus described my invention, what I claim is:—

1. In a device of the class described, the combination of a tire-carrying rim, a split side ring detachably seated on said rim and having a transverse slot therein, and means for locking said ring in position on said rim, comprising a locking member having a portion thereof movable into said slot, said member and said ring having interengaging parts whereby said member is held in locking position.

2. In a device of the class described, the combination of a tire-carrying rim, a split side ring detachably seated on said rim and having a transverse slot therein, and means for locking said ring in position on said rim, comprising a locking member having a portion thereof movable into said slot, said member having projections thereon cooperating with said ring to hold said member in locking position.

3. In a device of the class described, the combination of a tire-carrying rim, a split side ring seated on said rim and having lugs adjacent the ends thereof extending through said rim, each of said lugs having a notch therein, a rotatable member adapted to engage said notches to secure said ring in seated position, having portions thereof resiliently interlocked with said lugs to hold the member in its ring-securing position.

4. In a device of the class described, the combination of a tire-carrying rim having a pair of openings therein separated by a web portion, a split ring seated on said rim and having lugs thereon projecting through said openings, a locking member pivotally carried by said web portion and cooperating with said lugs to secure said ring in seated position, and means on said locking member resiliently interlocked with one of said lugs to hold said member in its ring-securing position.

5. In a device of the class described, the combination of a tire-carrying rim, a split side ring detachably seated on said rim, a resilient latch member pivotally carried by said rim having end portions adapted to cooperate with said ring to secure the ring in seated position, and a rotatable member of polygonal cross-section adapted to receive an operating tool, and engaging said latch member to rotate it to and from ring-securing position.

6. In a device of the class described, the combination of a tire-carrying rim, a split side ring seated on said rim and having lugs adjacent the ends thereof extending through said rim, each of said lugs having a notch therein, a spring latch pivotally carried by said rim having parts thereof adapted to engage in the notches in said lugs to secure said ring in seated position, and a rotatable member having a non-circular portion adapted for engagement by an operating tool and engaging said latch to turn it to and from locking position.

7. In a device of the class described, the combination of a tire-carrying rim having a pair of openings therein separated by a web portion, a split ring seated on said rim and having lugs thereon projecting through said openings, a latch member pivotally carried by said web portion and having end portions adapted to engage said lugs to hold said ring in seated position, said end portions being yieldable toward said rim, and a rotatable member engaging said latch member to turn it to and from lug-engaging position and having a portion thereof of polygonal cross-section to receive an operating tool.

8. In a device of the class described, the combination of a tire-carrying rim having a pair of openings therein separated by a web portion, a split ring seated on said rim and having lugs thereon projecting through said openings, a resilient member pivotally mounted on said rim having parts thereof adapted to engage said lugs to secure said ring in seated position, said lugs and said member interlocking to hold said member in ring-securing position, and a rotatable member engaging said resilient member to impart rotation thereto, said rotatable member having a non-circular portion adapted to be engaged by an operating tool.

In testimony whereof I affix my signature.

BERT M. KENT.